United States Patent
Chou et al.

(10) Patent No.: US 11,988,866 B2
(45) Date of Patent: May 21, 2024

(54) LIGHT CONDENSING LIGHT GUIDE PLATE AND DISPLAY APPARATUS

(71) Applicants: Nano Precision (SuZhou) CO., LTD., Jiangsu (CN); Coretronic Corporation, Hsin-Chu (TW)

(72) Inventors: Ming-Yu Chou, Hsinchu County (TW); Hsin Huang, Hsinchu County (TW); Hao-Jan Kuo, Hsinchu County (TW); Kuan-Wen Liu, Hsinchu County (TW); Yun-Chao Chen, Suzhou (CN)

(73) Assignees: Nano Precision (SuZhou) CO., LTD., Jiangsu (CN); Coretronic Corporation, Hsin-Chu (TW)

( * ) Notice: Subject to any disclaimer, the term of this patent is extended or adjusted under 35 U.S.C. 154(b) by 105 days.

(21) Appl. No.: 17/896,051

(22) Filed: Aug. 25, 2022

(65) Prior Publication Data
US 2023/0070680 A1   Mar. 9, 2023

(30) Foreign Application Priority Data
Sep. 6, 2021 (CN) .......................... 202111038781.X

(51) Int. Cl.
*F21V 8/00* (2006.01)
(52) U.S. Cl.
CPC ......... *G02B 6/0091* (2013.01); *G02B 6/0016* (2013.01); *G02B 6/003* (2013.01); *G02B 6/0038* (2013.01)
(58) Field of Classification Search
CPC ............... G02B 6/0036; G02B 6/0038; G02F 1/133615
See application file for complete search history.

(56) References Cited

U.S. PATENT DOCUMENTS

2004/0212757 A1* 10/2004 Lee ...................... G02B 6/0038
349/64
2015/0168630 A1* 6/2015 Park ..................... G02B 6/0036
362/625
(Continued)

FOREIGN PATENT DOCUMENTS

CN    201100869    8/2008
CN    101900301    12/2010
(Continued)

OTHER PUBLICATIONS

"Notice of allowance of China Counterpart Application", dated Sep. 15, 2022, p. 1-p. 3.

*Primary Examiner* — Abdulmajeed Aziz
*Assistant Examiner* — Steven Y Horikoshi
(74) *Attorney, Agent, or Firm* — JCIPRNET

(57) ABSTRACT

A light guide plate including a light emitting surface, a bottom surface, a light incident surface, multiple protrusion structures, and multiple grooves is provided. The light incident surface is connected between the light emitting surface and the bottom surface. The protrusion structures are disposed along a first direction and extend toward a second direction. The protrusion structures have a light condensing angle along the first direction, and the light condensing angle ranges from 10 degrees to 40 degrees. The grooves are disposed in the protrusion structures of the light guide plate. The grooves extend toward the first direction. The protrusion structures have a light receiving surface that defines each groove and is closer to the light incident surface. An angle between the light receiving surface and the bottom surface ranges from 35 degrees to 65 degrees. A display apparatus adopting the light guide plate is also provided.

11 Claims, 6 Drawing Sheets

(56) References Cited

U.S. PATENT DOCUMENTS

| | | | |
|---|---|---|---|
| 2020/0132908 A1* | 4/2020 | Yoon | G02B 6/0068 |
| 2020/0233146 A1 | 7/2020 | Yagi et al. | |
| 2020/0278583 A1* | 9/2020 | Sasaki | G02B 6/0065 |
| 2022/0019014 A1* | 1/2022 | Emmons | G02F 1/1336 |

FOREIGN PATENT DOCUMENTS

| | | |
|---|---|---|
| CN | 106352271 | 1/2017 |
| CN | 106501895 | 3/2017 |
| CN | 107179627 | 9/2017 |
| CN | 207704062 | 8/2018 |
| CN | 110488408 | 11/2019 |
| CN | 110967787 | 4/2020 |
| CN | 112015000 | 12/2020 |
| CN | 212229385 | 12/2020 |
| KR | 20080038594 | 5/2008 |
| TW | 481915 | 4/2015 |

* cited by examiner

LIGHT CONDENSING LIGHT GUIDE PLATE AND DISPLAY APPARATUS

CROSS-REFERENCE TO RELATED APPLICATION

This application claims the priority benefit of China application serial no. 202111038781.X, filed on Sep. 6, 2021. The entirety of the above-mentioned patent application is hereby incorporated by reference herein and made a part of this specification.

BACKGROUND

Technical Field

The disclosure relates to a lighting and display technology, and particularly, to a light condensing light guide plate and a display apparatus.

Description of Related Art

With the wide application of non-self-luminous displays such as liquid crystal displays, the design of backlight modules also needs to be adjusted for different usage scenarios. To improve the light energy utilization rate of a light source, backlight modules equipped with brightness enhancement film (BEF) have become the mainstream in the market. Generally speaking, this type of backlight modules are equipped with laminated structure, and the laminated structure consists of two brightness enhancement films (e.g., two prism sheets whose extension directions of the prism are orthogonal to each other) and two diffusion sheet films. The laminated structure may guide beams emitted from the light guide plate at a large angle to a specific angle range including the front viewing angle to improve the light intensity of the backlight module near the front viewing angle. However, this type of two BEFs configuration has limitations on the thinning of the backlight module, and the production cost is relatively high.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a light condensing light guide plate with favorable light condensing properties.

The disclosure provides a display apparatus, which has a lighter and thinner appearance and a low production cost.

In order to achieve one, part of, or all of the objectives or other objectives, an embodiment of the disclosure provides a light condensing light guide plate. The light condensing light guide plate includes a light emitting surface, a bottom surface, a light incident surface, multiple protrusion structures, and multiple grooves. The light emitting surface is disposed opposite to the bottom surface. The light incident surface is connected between the light emitting surface and the bottom surface. The protrusion structures are disposed on the bottom surface. The protrusion structures include two side surfaces and are disposed along the first direction and extend toward the second direction. The first direction is perpendicular to the second direction, and the second direction is perpendicular to the light incident surface. Each of the protrusion structures has a light condensing angle along the first direction, the light condensing angle ranges from 10 degrees to 40 degrees, and the light condensing angle is an angle range corresponding to a half-height width of a light emission distribution of each of the protrusion structures. The grooves are disposed in the protrusion structures of the light condensing light guide plate. The grooves are disposed along the second direction and extend toward the first direction, and the grooves are connected to the corresponding side surfaces. The protrusion structures have a light receiving surface that defines each groove and is closer to the light incident surface, and an angle between the light receiving surface and the bottom surface ranges from 35 degrees to 65 degrees.

In order to achieve one, part of, or all of the above objectives or other objectives, an embodiment of the disclosure provides a display apparatus. The display apparatus includes a backlight module and a display panel. The backlight module includes a light condensing light guide plate and a light source. The light condensing light guide plate includes a light emitting surface, a bottom surface, a light incident surface, a plurality of protrusion structures, and a plurality of grooves. The bottom surface is disposed opposite to the light emitting surface. The light incident surface is connected between the light emitting surface and the bottom surface. The protrusion structures are disposed on the bottom surface. The protrusion structures include two side surfaces, are disposed along a first direction, and extend toward a second direction. The first direction is perpendicular to the second direction, and the second direction is perpendicular to the light incident surface. The illuminating beam has a light condensing angle after being reflected by each of the protrusion structures, the light condensing angle ranges from 10 degrees to 40 degrees, and the light condensing angle is an angle range corresponding to a half-height width of a light emission distribution of each of the protrusion structures. The grooves are disposed in the protrusion structures of the light condensing light guide plate, the grooves are disposed along the second direction and extend toward the first direction, and the grooves are connected to the corresponding side surfaces. The protrusion structures include a light receiving surface that defines each of the grooves and is closer to the light incident surface, and an angle between the light receiving surface and the bottom surface ranges from 35 degrees to 65 degrees. The light source is disposed on one side of the light incident surface of the light condensing light guide plate and used to emit the illuminating beam toward the light incident surface, and the illuminating beam is transmitted in the light condensing light guide plate and emitted through the light emitting surface. The display panel is overlapped with and disposed on the light emitting surface of the light condensing light guide plate.

In summary, in the light condensing light guide plate and the display apparatus of an embodiment of the disclosure, multiple protrusion structures are disposed on the bottom surface of the light condensing light guide plate along the first direction. The protrusion structures may reduce the light emission angle range of the light condensing light guide plate in the first direction. Multiple grooves extending in the first direction are disposed in the protrusion structures. By adjusting the angle between the light receiving surface and the bottom surface of the grooves, the main light-emitting direction of the backlight module along the second direction may be changed. From another point of view, the configuration of the protrusion structures may effectively suppress the stray light generated by the backlight module in the first direction and increase the brightness value of the backlight module. Compared with the conventional backlight module that uses a stack of multiple optical films (e.g., brightness enhancement films and diffusion sheets) and light guide plates, the backlight module of the embodiment only uses a light guide plate (and no microlens structure may be disposed on the light emitting surface of the light guide plate) to achieve the required optical performance, which contributes to reducing the production cost and the overall thickness of the display apparatus.

Other objectives, features and advantages of the disclosure may be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" Component is directly "adjacent to" "B" component or one or more additional components are between "A" component and "B" component. Accordingly, the drawings and descriptions may be regarded as illustrative in nature and not as restrictive.

Figure 1:
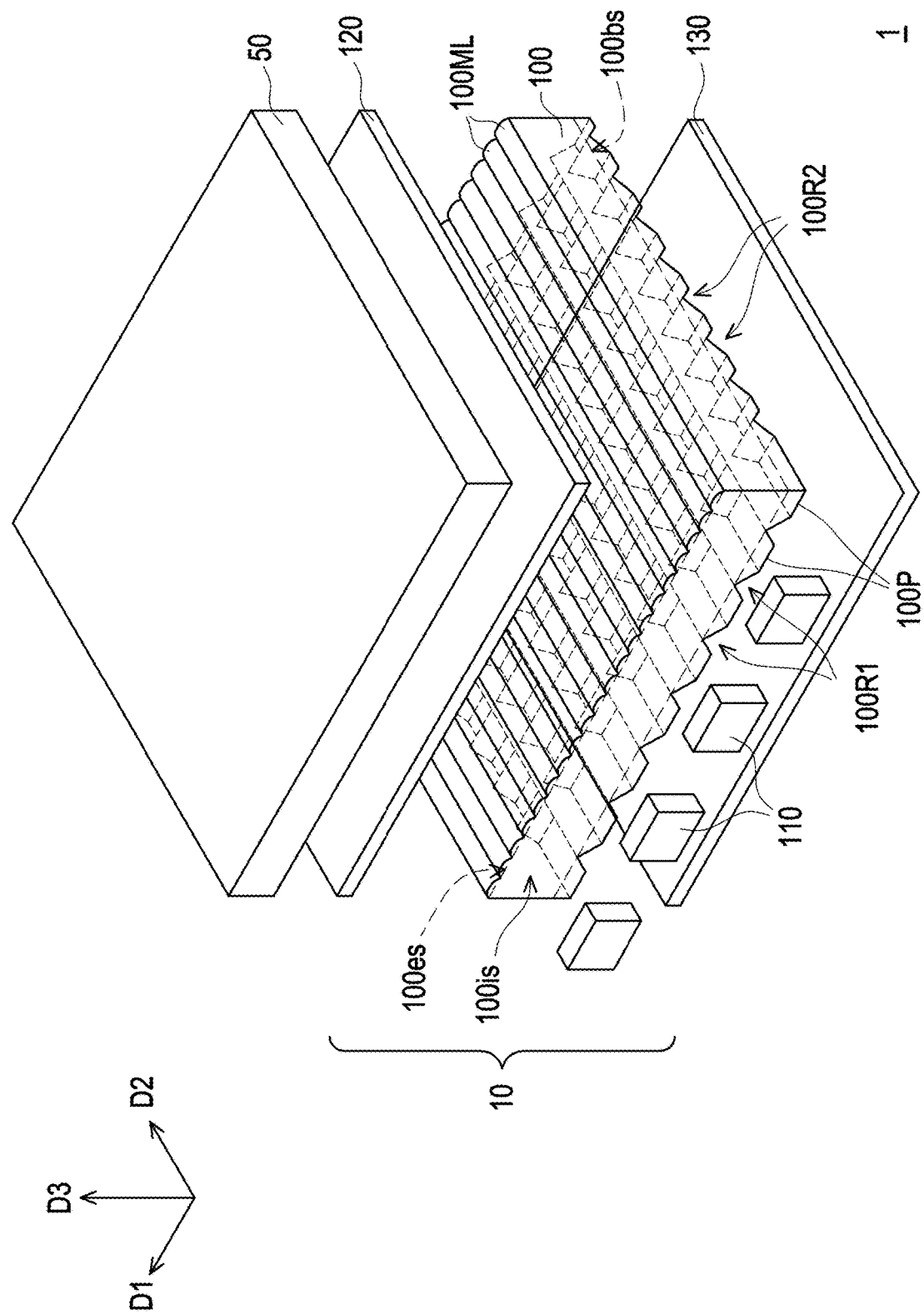
FIG. 1 is a schematic view of a display apparatus according to the disclosure.
Figure 2A:
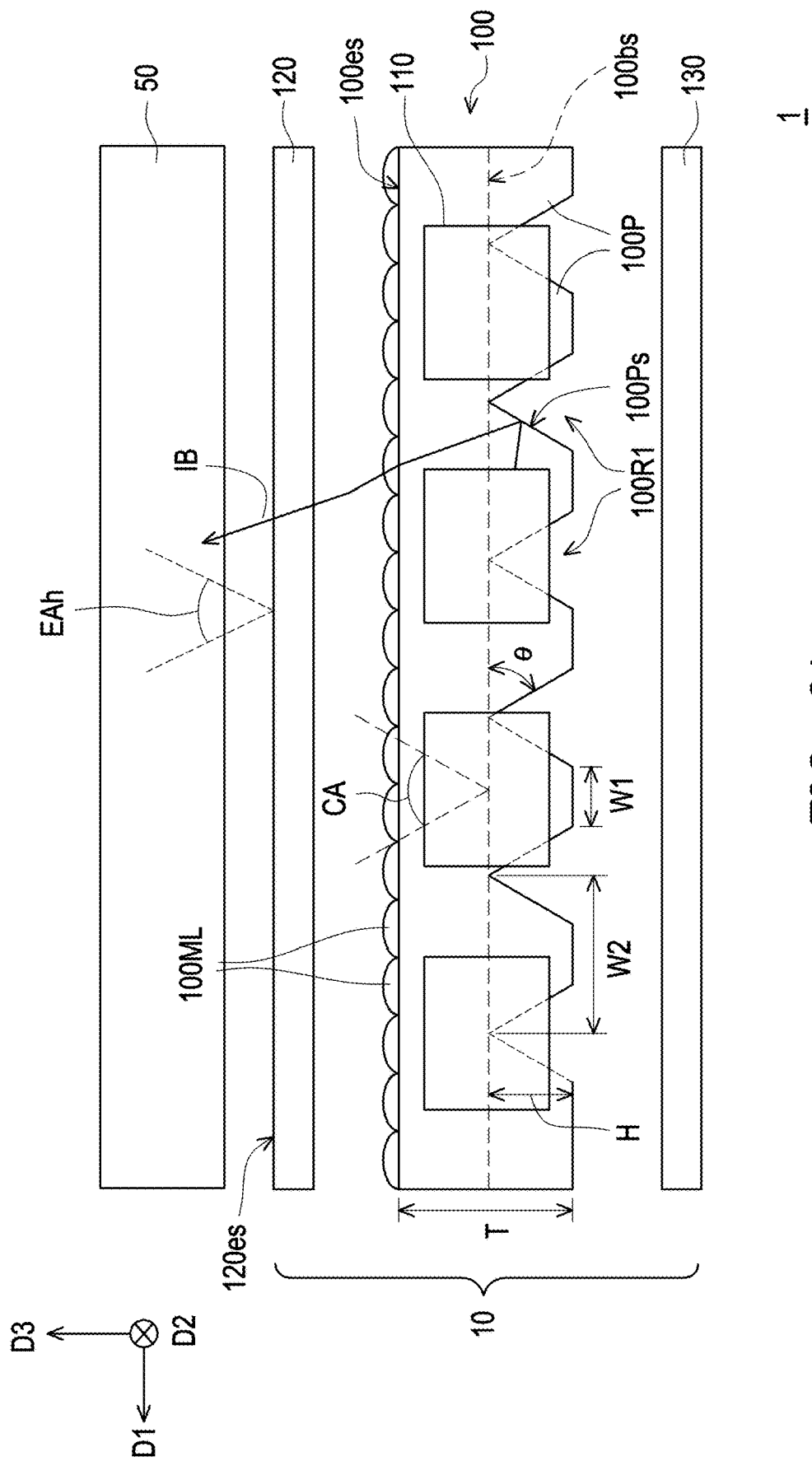
FIG. 2A and FIG. 2B are schematic side views of the display apparatus of FIG. 1 in different directions.
Figure 2B:
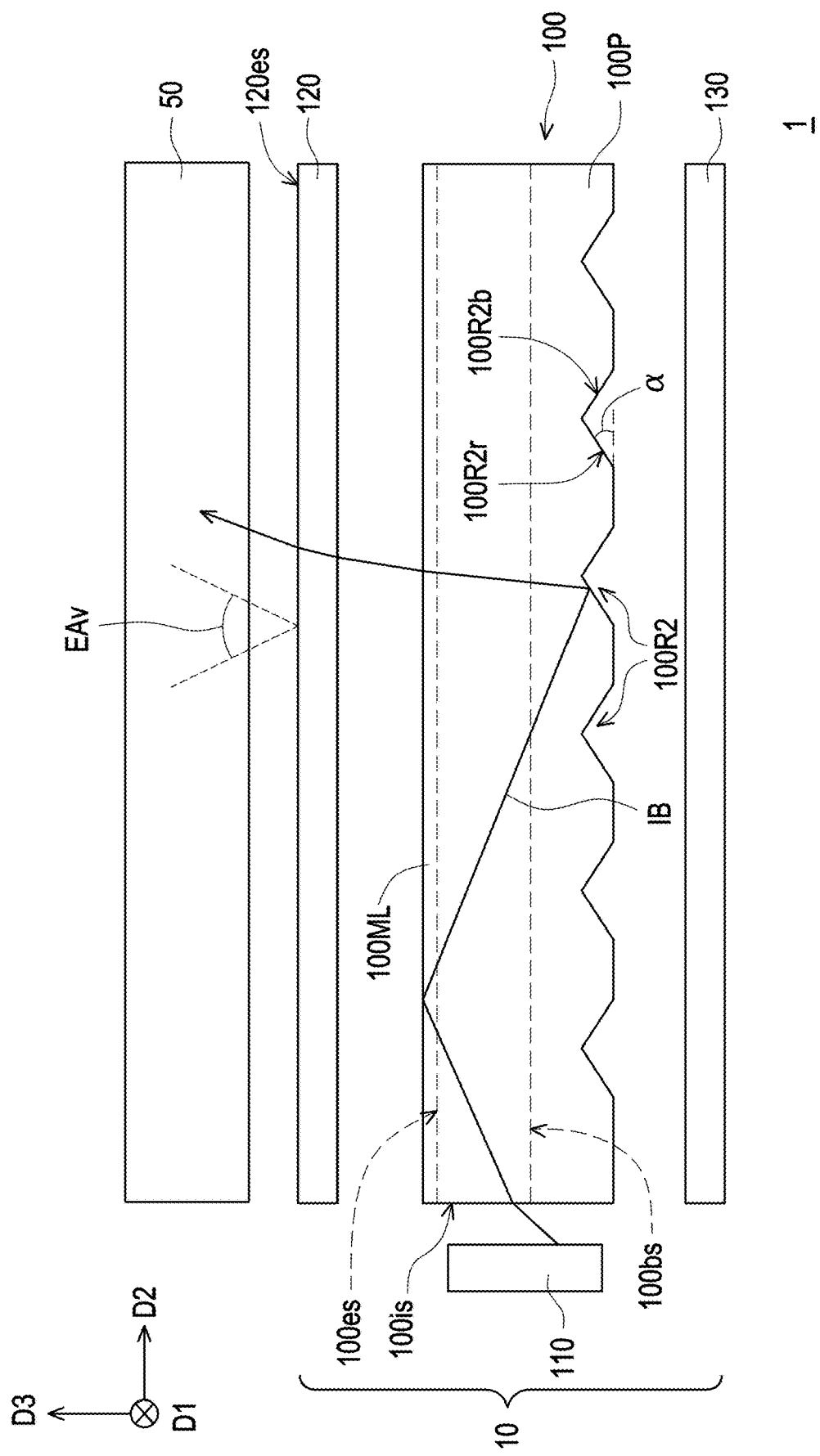
Figure 3:
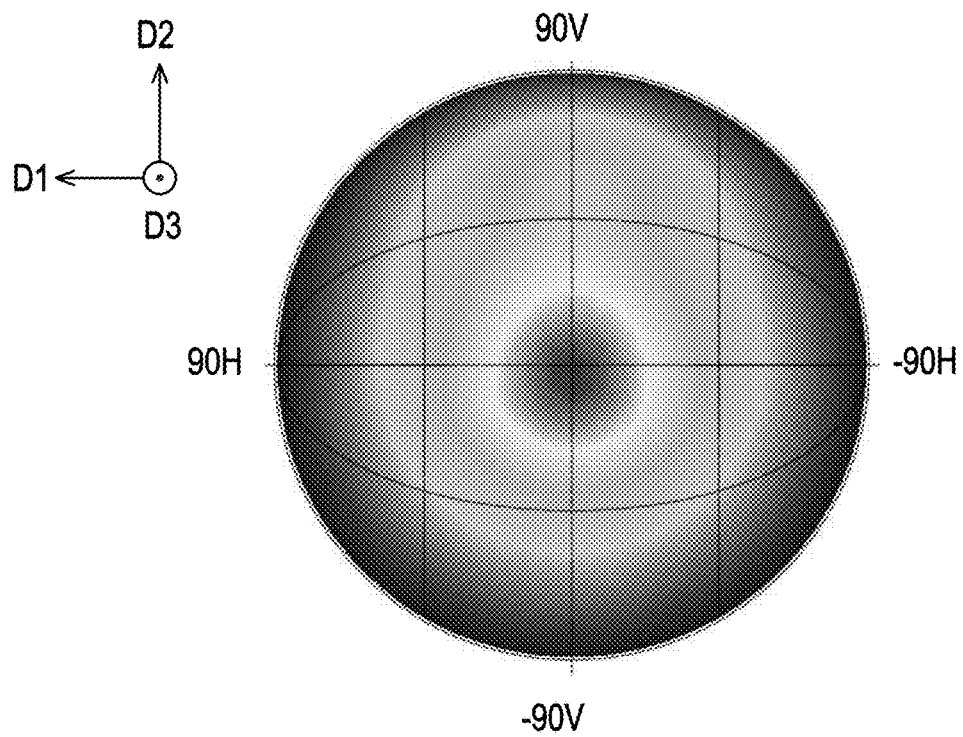
FIG. 3 is a brightness distribution diagram of the backlight module of FIG. 1 under different viewing angles.
Figure 4:
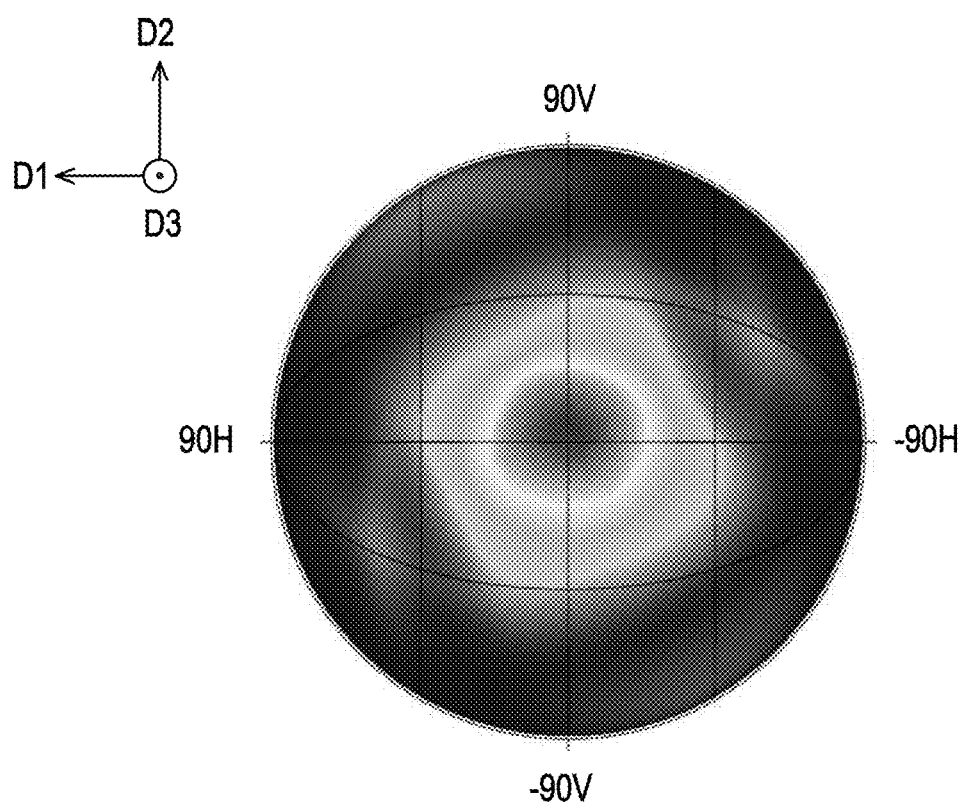
FIG. 4 is a brightness distribution diagram of a backlight module of a comparative example under different viewing angles.
Figure 5:
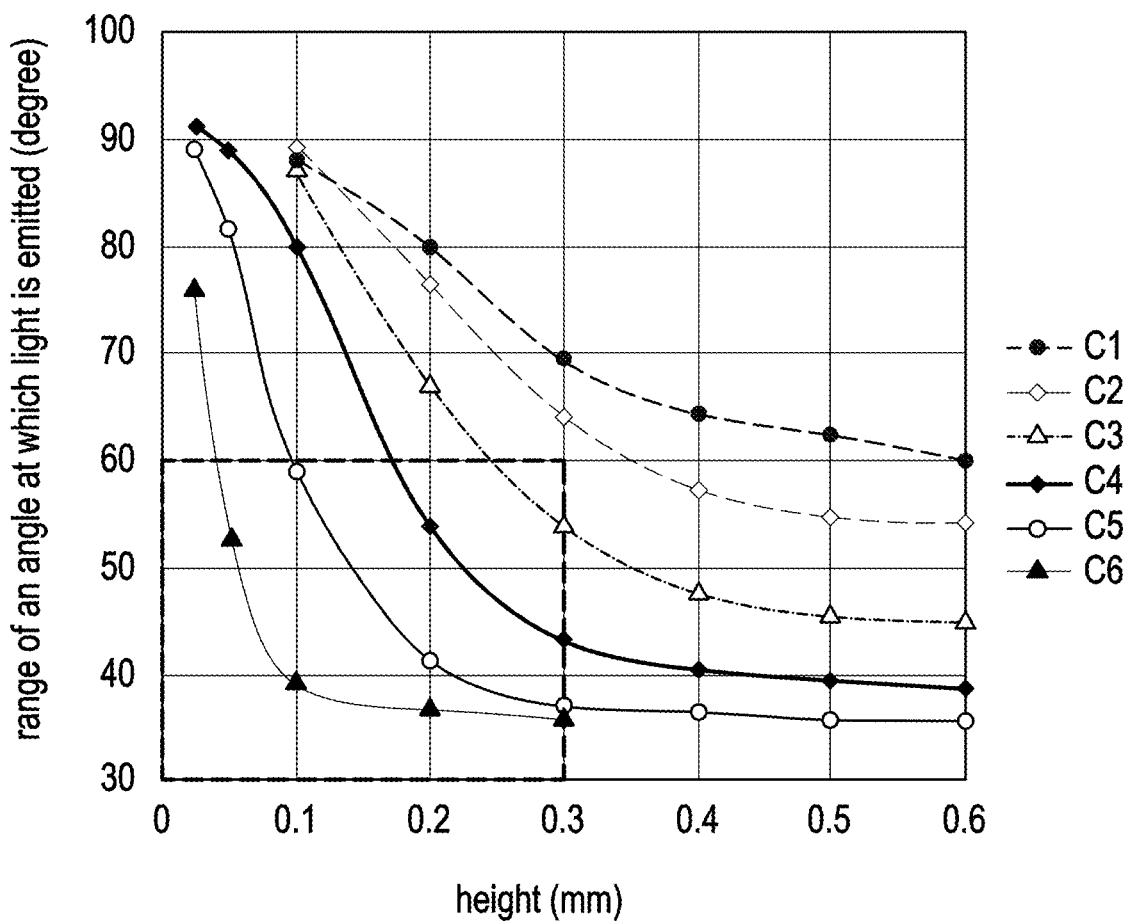
FIG. 5 is a curve graph illustrating the relationship between the height of different protrusion structures and the range of a light emitting angle at different light condensing angles of the light condensing light guide plate of the backlight module of FIG. 2A.

FIG. 1 is a schematic view of a display apparatus according to the disclosure. FIG. 2A and FIG. 2B are schematic side views of the display apparatus of FIG. 1 in different directions. FIG. 3 is a brightness distribution diagram of the backlight module of FIG. 1 under different viewing angles. FIG. 4 is a brightness distribution diagram of a backlight module of a comparative example under different viewing angles. FIG. 5 is a curve graph illustrating the relationship between the height of different protrusion structures and the range of a light emitting angle at different light condensing angles of the light condensing light guide plate of the backlight module of FIG. 2A.

Referring to FIG. 1 to FIG. 2B, a display apparatus 1 includes a backlight module 10 and a display panel 50. The backlight module 10 includes a light condensing light guide plate 100 and at least one light source 110. The light condensing light guide plate 100 has a light incident surface 100$is$, a light emitting surface 100$es$, and a bottom surface 100$bs$. The bottom surface 100$bs$ is disposed opposite to the light emitting surface 100$es$ (e.g., the bottom surface 100$bs$ is parallel to the light emitting surface 100$es$), and the light incident surface 100$is$ is connected between the light emitting surface 100$es$ and the bottom surface 100$bs$. The at least one light source 110 is disposed on one side of the light incident surface 100$is$ of the light condensing light guide plate 100. That is, the backlight module 10 of the embodiment is an edge-type backlight module.

The display panel 50 is disposed on and overlapped with the light emitting surface 100$es$ of the light condensing light guide plate 100. The light source 110 is used to emit an illuminating beam IB toward the light incident surface 100$is$. The illuminating beam IB is transmitted in the light condensing light guide plate 100, emitted through the light emitting surface 100$es$, and then transmitted toward the display panel 50. In the embodiment, for example, the display panel 50 is a liquid crystal display panel or other non-self-luminous display panels. Note that in the embodiment, the number of the at least one light source 110 is 4 as an exemplary illustration, and this does not mean that the disclosure is limited by the content of the drawings. In other embodiments, the number of the light sources 110 may be adjusted according to the optical design of the backlight module.

In the embodiment, the backlight module 10 may also optionally include a diffusion sheet 120. The diffusion sheet 120 is disposed on one side of the light emitting surface 100$es$ of the light condensing light guide plate 100 and is disposed between the display panel 50 and the light condensing light guide plate 100. Accordingly, the concealability and the light emission uniformity of the backlight module 10 are increased. Note that the configuration of the diffusion sheet 120 has almost no effect on the light emission type of the light condensing light guide plate 100. In other embodiments, no optical film may be disposed between the display panel 50 and the light condensing light guide plate 100. Therefore, the display panel 50 may also be disposed in direct contact with the light emitting surface 100es of the light condensing light guide plate 100, and the light emission type of the illuminating beam IB after passing through the display panel 50 is the same as the light emission type of the illuminating beam IB emitted from the light emitting surface 100es of the light condensing light guide plate 100 (i.e., the light emission type of the illuminating beam IB on the light emitting surface 100es of the light condensing light guide plate 100). Note that the same light emission type in the disclosure means that the shape of the light emission type is similar or of the same type, and the ratio of the horizontal light emission angle range to the vertical light emission angle range of the light emission type is the same or has a difference less than 5%. In the embodiment, a reflecting sheet 130 may be disposed on one side of the bottom surface 100bs of the light condensing light guide plate 100 to increase the light energy utilization rate of the backlight module 10, and the reflecting sheet 130 is a white reflecting sheet or a silver reflecting sheet, for example, but the disclosure is not limited thereto.

The illuminating beam IB has a light emission type on the light emitting surface 100es of the light condensing light guide plate 100, the light emission type has a horizontal light emission angle range EAh along a direction D1. To reduce the horizontal light emission angle range EAh, the light condensing light guide plate 100 may include multiple protrusion structures 100P, and the protrusion structures 100P are disposed on the bottom surface 100bs of the light condensing light guide plate 100, and the protrusion structures 100P are disposed along the direction D1 and extend toward a direction D2. For example, the direction D1 is perpendicular to the direction D2, and the direction D2 is perpendicular to the light incident surface 100is. In the embodiment, the protrusion structures 100P may be connected to each other, for example, each protrusion structure 100P includes two side surfaces 100Ps and a base surface, and the base surface is connected to the side surfaces 100Ps. Each of the side surfaces 100Ps is directly connected between the bottom surface 100bs and the base surface of the protrusion structure 100P, and the side surfaces 100Ps extend toward the direction D2, for example. Note that the horizontal light emission angle range EAh is defined by the angle range corresponding to the half-height width of the light emission distribution of the illuminating beam IB on the light emitting surface 120es of the diffusion sheet 120 and along the direction D1 (through a front viewing angle). Since the diffusion sheet 120 has almost no effect on the light type of the light condensing light guide plate 100, the horizontal light emission angle range EAh may also be regarded as the half-height width of the light emission distribution of the light emission type of the light emitting surface 100es along the direction D1 (through the front viewing angle). The light emission type is the shape of the half-height width of the viewing angle, and the light emission distribution is the range of the half-height width of the viewing angle in the horizontal direction and vertical direction.

In the embodiment, the angle between the light path of the illuminating beam IB reflected by each protrusion structure 100P and the normal direction (e.g., a direction D3) of the light emitting surface 100es less than 20 degrees. That is, each protrusion structure 100P of the light condensing light guide plate 100 may have a light condensing angle CA ranging from 10 degrees to 40 degrees for the illuminating beam IB along the direction D1 (i.e., the angle range corresponding to the half-height width of the light emission distribution of each protrusion structure 100P). Accordingly, it contributes to controlling the horizontal light emission angle range EAh of the backlight module 10 along the direction D1 to be less than 60 degrees (the horizontal light emission angle range EAh includes the front viewing angle) and improving the light emission brightness of the backlight module 10 near the front viewing angle. Note that the light condensing angle CA of the protrusion structure 100P of the light condensing light guide plate 100 may be regarded as the optical characteristic of the protrusion structure 100P, which may be obtained by optical simulation, or by measuring the light source disposed on the light incident surface 100is of the light condensing light guide plate 100.

Furthermore, the protrusion structures 100P of the light condensing light guide plate 100 may define multiple spacing grooves 100R1, and the side surface 100Ps of the protrusion structure 100P defining the spacing groove 100R1, and the side surface 100Ps is adapted for reflecting and transmitting the illuminating beam IB from the light source 110 toward the direction D2. Specifically, the protrusion structure 100P extends from the light incident surface 100is toward the direction D2 to another surface of the light condensing light guide plate 100 (i.e., the extension length of the protrusion structure 100P is equal to the length of the light condensing light guide plate 100 in the direction D2), and the shape and the area of the cross section (e.g., the cross section parallel to the light incident surface 100is of the light condensing light guide plate 100) of the protrusion structure 100P remain the same, thereby facilitating the transmission and the condensation of the illuminating beam IB in the light condensing light guide plate 100. For example, part of the illuminating beam IB is transmitted to the diffusion sheet 120 through the reflected by the side surface 100Ps, and another part of the illuminating beam IB is transmitted to the diffusion sheet 120 through the reflected by the side surface 100Ps and the base surface. In the embodiment, each protrusion structure 100P has a base angle θ closer to the bottom surface 100bs. Specifically, there is the base angle θ between the side surface 100Ps of the protrusion structure 100P and the bottom surface 100bs, and the base angle θ may range from 30 degrees to 80 degrees. On the other hand, the light condensing light guide plate 100 has a thickness T in the direction D3 perpendicular to the light emitting surface 100es, the protrusion structure 100P has a height H in the direction D3, and the ratio of the height H to the thickness T may range from 0.025 to 0.9. For example, the thickness T is the distance between the highest point and the lowest point of the light condensing light guide plate 100 in the direction D3 (e.g., the distance from the light emitting surface 100es to the base surface of the protrusion structure). For example, when the thickness T of the light condensing light guide plate 100is 0.65 mm, the height H may range from 0.016 mm to 0.6 mm. Note that in one embodiment, in the direction D3, the distance between the center of each light source 110 and the bottom surface 100bs of the light condensing light guide plate 100 is greater than or equal to 0 and less than or equal to 10% of the thickness T of the light condensing light guide plate 100, accordingly the reflection ratio of the illuminating beam IB emitted by the light source 110 and reflected by the protrusion structure 100P may be increased, and therefore light condensing performance may be improved.

The protrusion structure 100P has a minimum width W1 and a maximum width W2 along the direction D1. The minimum width W1 refers to the width (e.g., the bottom surface of the protrusion structure 100P) of the protrusion structure 100P that is furthest away from the bottom surface 100bs of the light condensing light guide plate 100. The maximum width W2 refers to the width of the protrusion structure 100P closest to the bottom surface 100bs (or the width of the protrusion structure 100P connected to the bottom surface 100bs). That is, the width of the protrusion structure 100P along the direction D1 decreases gradually as it gets away from the bottom surface 100bs of the light condensing light guide plate 100. In the embodiment, the minimum width W1 may be greater than or equal to 5 μm and less than or equal to 500 μm, and the maximum width W2 may be greater than or equal to 10 μm and less than or equal to 1000 μm.

For example, in the embodiment, the profile of the cross section (e.g., the cross section parallel to the light incident surface 100is of the light condensing light guide plate 100) of the protrusion structure 100P is trapezoidal (upside down).

On the other hand, referring to FIG. 1 and FIG. 2B, the light condensing light guide plate 100 further includes multiple grooves 100R2, and the grooves 100R2 are disposed in the protrusion structures 100P. Specifically, for example, the grooves 100R2 are disposed on the surface of the protrusion structure 100P away from the bottom surface 100bs of the light condensing light guide plate 100 and recessed toward the protrusion structure 100P. The surface of the protrusion structures 100P away from the bottom surface 100bs of the light condensing light guide plate 100 is parallel to the bottom surface 100bs, for example. In the direction D3, the height of the grooves 100R2 is less than the height H of the protrusion structures 100P. The grooves 100R2 are disposed along the direction D2 and extend toward the direction D1. That is, the grooves 10082 are connected to the spacing grooves 100R1, and this means that the grooves 100R2 may be connected to the corresponding side surfaces 100Ps, and the extension direction of the grooves 100R2 is substantially perpendicular to the extension direction of the protrusion structure 100P. In detail, the protrusion structure 100P also has a light receiving surface 100R2r (toward the light incident surface 100is) that defines the groove 100R2 and is closer to the light incident surface 100is of the light condensing light guide plate 100 and a backlight surface 100R2b that is further away from the light incident surface 100is. In the embodiment, an angle α between the light receiving surface 100R2r and the bottom surface 100bs ranges from 35 degrees to 65 degrees. Thus, the light emission type of the light emitting surface 100es of the light condensing light guide plate 100 has a vertical light emission angle range EAv along the direction D2, which may be less than 60 degrees and include the front viewing angle. The adjustment of the angle α may change the main light emission direction of the backlight module 100 along the direction D2. Specifically, in the embodiment, with the configuration of protrusion structure 100P and the configuration of the angle α between the light receiving surface 100R2r and the bottom surface 100bs ranging from 35 degrees to 65 degrees, the ratio of the horizontal light emission angle range EAh to the vertical light emission angle range EAv may be greater than 0.9 or greater than 0.95.

Specifically, in other embodiments, the bottom of the groove 100R2 of the light condensing light guide plate 100 close to the bottom surface 100bs may have a rounded corner design or a flat top design, and the radius of curvature of the rounded corner may range from 5 μm to 50 μm. Accordingly, in the manufacturing process of the light condensing light guide plate 100, the groove 100R2 may be used as a gas exhaust channel to improve the exhaust during injection molding process.

In other embodiments, to further reduce the horizontal light emission angle range EAh of the backlight module 10 along the direction D1, multiple microlens structures 100ML are optionally disposed on the light emitting surface 100es of the light condensing light guide plate 100. Each microlens structure extends from the light incident surface 100is along the direction D2 to a surface of the light condensing light guide plate 100 opposite to the light incident surface 100is, and microlens structures are arranged parallel to each other along the direction D1. That is, the extension direction of the microlens structure 100ML is substantially parallel to the extension direction of the protrusion structure 100P. However, the disclosure is not limited thereto. In other embodiments, the microlens structure 100ML on the light emitting surface 100es of the light condensing light guide plate 100 may also be replaced with other optical micro-structures, such as a groove structure that is concave V-shaped, concave pentagonal, or concave hexagonal, or a groove structure with a convex arc profile with a specific radius of curvature according to different application requirements.

In a preferred embodiment, for example, the base angle θ of the protrusion structure 100P ranges from 40 degrees to 60 degrees, the ratio of the height H of the protrusion structure 100P to the thickness T of the light condensing light guide plate 100 ranges from 0.15 to 0.2, for example, the angle α between the light receiving surface 100R2r and the bottom surface 100bs ranges from 45 degrees to 55 degrees, and the light condensing angle CA ranges from 10 degrees to 30 degrees, for example. Accordingly, the horizontal light emission angle range may be controlled to be within a range of less than 60 degrees. In detail, FIG. 3 and FIG. 4 respectively illustrate the brightness distribution of the backlight module 10 of the embodiment and the brightness distribution of the backlight module of a comparative example under different viewing angles. In the embodiment, the base angle θ of the protrusion structure 100P is 47.5 degrees, for example, the ratio of the height H of the protrusion structure 100P to the thickness T of the light condensing light guide plate 100 is 0.165, for example, and the angle α between the light receiving surface 100R2r and the bottom surface 100bs is 50 degrees. The backlight module of the comparative example is a combination of a light guide plate without a protrusion structure, two diffusion sheets, and two orthogonal brightness enhancement films (BEF), for example. According to FIG. 3 and FIG. 4, in the two backlight modules, the horizontal light emission angle range has little difference and may be controlled to be within a range of less than 60 degrees. The difference between the brightness distribution of the backlight module of FIG. 3 and the brightness distribution of the backlight module of FIG. 4 is that the backlight module 10 (as shown in FIG. 3) of the embodiment has favorable light emission uniformity at all angles (e.g., the light emission type of the half-height width is approximately round, and 30% of the light emission type is also approximately round), and the light emission of the backlight module of the comparative example at a viewing angle of 45 degrees (e.g., ±45V, ±45H) is significantly lower than the light emission of a horizontal 45 degrees (e.g., 0, ±45H).

In other words, with the design of adopting only one diffusion sheet 120 along with the protrusion structure 100P, the backlight module 10 of the embodiment achieves optical performance close to the optical performance of conventional brightness enhancement backlight modules and has more uniform light emission. Therefore, the backlight module 10 of the embodiment may effectively reduce the production cost and the overall thickness of the display apparatus 1.

Referring to FIG. 2A and FIG. 5, for the protrusion structure 100P with different light condensing angles CA, the horizontal light emission angle range EAh of the backlight module 10 along the direction D1 varies with the change rate of the height H of the different protrusion structures 100P. Note that the change rate may increase as the light condensing angle CA decreases in the range where the height H of the protrusion structure 100P is less than 0.3 mm. In FIG. 5, for example, the thickness T of the light guide plate is 0.65 mm, and a curve C1 to a curve C6 respectively represent the change of the horizontal light emission angle range EAh relative to the height H of the protrusion structure 100P when the light condensing angles CA of the protrusion structure 100P are 60 degrees, 50 degrees, 40 degrees, 30 degrees, 20 degrees, and 10 degrees. For example, when the light condensing angle CA of the protrusion structure 100P is relatively large, the change of the horizontal light emission angle range EAh relative to the height H of the protrusion structure 100P is mild. On the contrary, when the light condensing angle CA of the protrusion structure 100P is relatively small, the change of the horizontal light emission angle range EAh relative to the height H of the protrusion structure 100P is significant.

From another point of view, at the same height H of the protrusion structure 100P, the horizontal light emission angle range EAh and the light condensing angle CA of the protrusion structure 100P are positively correlated. That is, the smaller the light condensing angle CA of the protrusion structure 100P is, the smaller the horizontal light emission angle range EAh of the backlight module 10 is. Note that both the height H of the protrusion structure 100P and the profile of the cross section (i.e., the cross section parallel to the light incident surface 100*is*) of the side surface 100Ps affect the light condensing angle CA of the protrusion structure 100P. For example, in the embodiment, the side surface 100Ps of the protrusion structure 100P is a tilted plane relative to the bottom surface 100*bs*. Therefore, the degree of the angle (i.e., the base angle θ) between the side surface 100Ps and the bottom surface 100*bs* is one of the important factors that determine the light condensing angle CA of the protrusion structure 100P. For example, to control the horizontal light emission angle range EAh to be less than 60 degrees, when the height H of the protrusion structure 100P is less than 0.3 mm, the light condensing angle CA of the protrusion structure 100P may be optionally less than 40 degrees; when the light condensing angle CA of the protrusion structure 100P is less than or equal to 40 degrees, the height H of the protrusion structure 100P may be optionally greater than 0.25 mm; when the light condensing angle CA of the protrusion structure 100P is 20 degrees, the height H of the protrusion structure 100P may be optionally greater than 0.1 mm; when the light condensing angle CA of the protrusion structure 100P is 10 degrees, the height H of the protrusion structure 100P may be optionally greater than 0.04 mm.

Other embodiments are provided below for illustration of the disclosure. The same reference numbers are used to indicate the same or similar elements, and the description of the same technical content is omitted. For the description of the omitted parts, reference may be made to the foregoing embodiments, which is not iterated in the subsequent paragraphs.

Figure 6A:
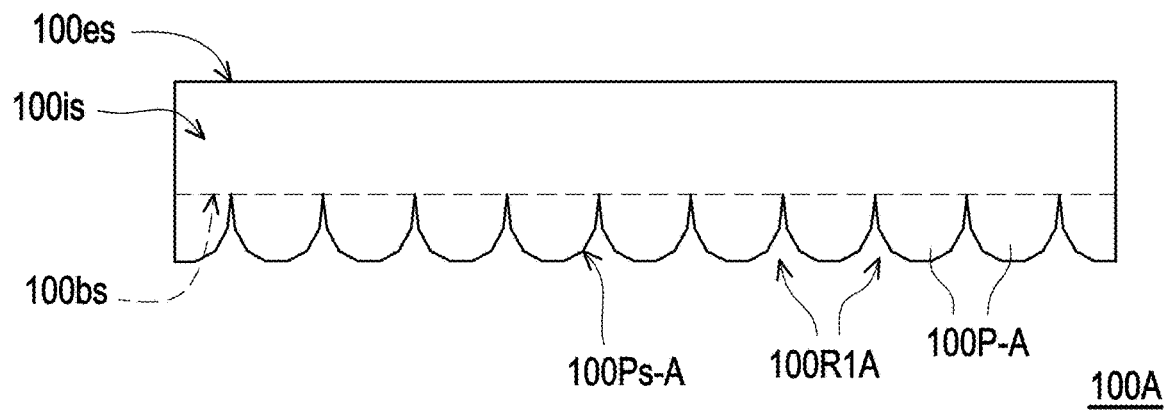
FIG. 6A to FIG. 6C are schematic side views of light condensing light guide plates according to other embodiments of the disclosure.
Figure 6B:
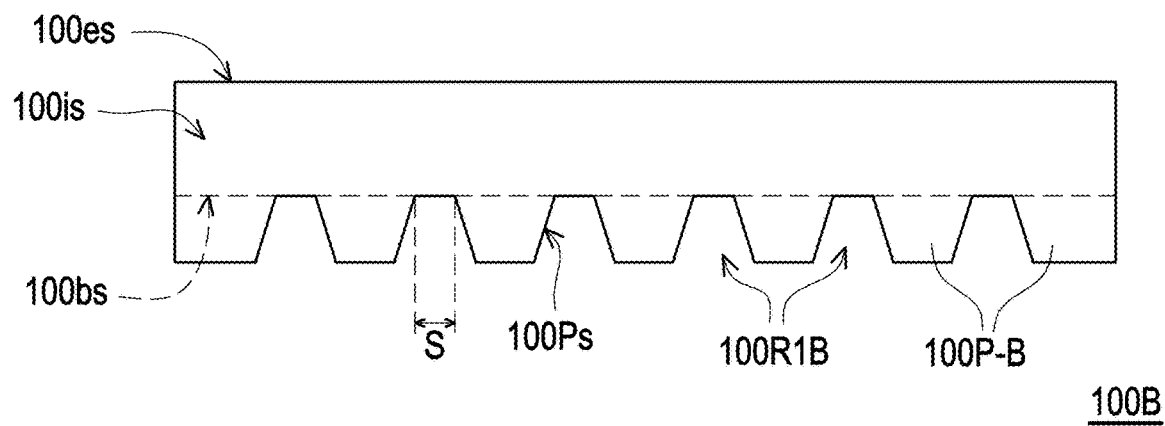
Figure 6C:
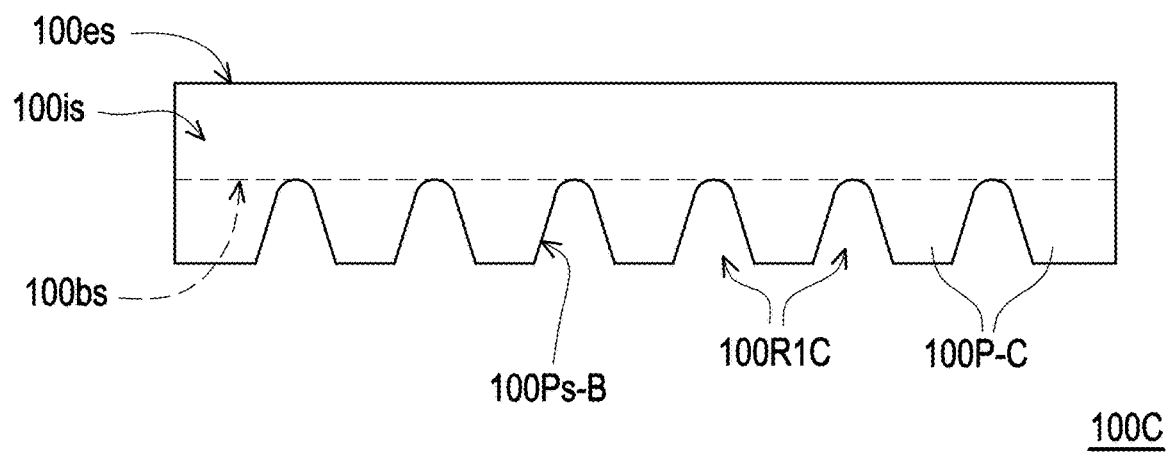

FIG. 6A to FIG. 6C are schematic side views of light condensing light guide plates according to other embodiments of the disclosure. Note that any one of the light condensing light guide plates in FIG. 6A to FIG. 6C may be used to replace the light condensing light guide plate 100 of FIG. 1, and the technical effect produced is similar to that of the backlight module 10 of FIG. 1. Therefore, for the detailed illustration, refer to the relevant paragraphs of the foregoing embodiment, which may not be repeated here.

Referring to FIG. 6A, the difference between the light condensing light guide plate 100A of the embodiment and the light condensing light guide plate 100 of FIG. 2A is that the profile of the cross section (e.g., the cross section parallel to the light incident surface 100*is* of the light condensing light guide plate 100A) of a protrusion structure 100P-A of the light condensing light guide plate 100A is a combination of multiple straight line segments, and the shape is similar to a bowl (or U-shape). More specifically, the protrusion structure 100P-A has a side surface 100Ps-A defining a spacing groove 100R1A, the cross section of each protrusion structure 100P-A has two side lines (corresponding to the side surface 100Ps-A) and a bottom line connected to the two side lines (corresponding to the base surface of the protrusion structure 100P connected to the two side surfaces 100Ps-A), for example, the bottom line is parallel to the bottom surface 100*bs*, and each side line is connected between the bottom surface 100*bs* and the bottom line, respectively. Each side line includes multiple straight line segments, and the slope of each straight line segment increases as it approaches the bottom surface 100*bs*. The slope of each straight line segment ranges from 0.55 to 5.7, for example (i.e., the angle between each straight line segment and the bottom surface 100*bs* ranges from 30 degrees to 80 degrees). Note that in the disclosure, the slope refers to the absolute value of the slope, and the increase in the slope is the increase in the absolute value of the slope. In the embodiment, through the incremental change of the slope of each straight line segment, the illuminating beam IB may be made to move in the same direction after being reflected by the protrusion structure 100P-A, which may further improve the light condensation of the protrusion structure 100P-A and prevent stray light. Note that in the embodiment, the number of multiple straight line segments of the cross section of the protrusion structure 100P-A corresponding to the side line of the side surface 100Ps-A is 3 as an exemplary illustration, and this does not mean that the disclosure is limited by the content of the drawings. In other embodiments, the number of the multiple straight line segments may range from 2 to 5. As the number of multiple straight line segments increases, the side line may also be regarded as a curve (e.g., a parabola with an increasing slope).

Referring to FIG. 6B, different from the light condensing light guide plate 100 of FIG. 2A, a light condensing light guide plate 100B of the embodiment includes multiple protrusion structures 100P-B that may be separated from each other in the configuration direction. Moreover, part of the bottom surface 100bs of the light condensing light guide plate 100B and the side surfaces 100Ps of the protrusion structures 100P-B may define multiple spacing grooves 100R1B. In the embodiment, any two adjacent protrusion structures 100P-B have a pitch S along the configuration direction, and the pitch S may range from 10 µm and 1000 µm.

In the embodiment of FIG. 6C, the profile of the cross section (e.g., a cross section parallel to the light incident surface 100is of the light condensing light guide plate 100C) of a protrusion structure 100P-C of a light condensing light guide plate 100C may be polygonal line, curved, or a combination thereof. More specifically, the protrusion structure 100P-C defines that the part of the side surface 100Ps-B of the spacing groove 100R1C near the bottom surface 100bs of the light condensing light guide plate 100C is a concave arc surface. This may facilitate the production of the protrusion structure 100P-C.

Since the height and the width of the projection structure of the light condensing light guide plate in FIG. 6A to FIG. 6C are similar to the height and the width of the light condensing light guide plate 100 of FIG. 1. Therefore, for the detailed illustration, refer to the relevant paragraphs of the foregoing embodiment, which may not be repeated here.

In summary, in the light condensing light guide plate and the display apparatus of an embodiment of the disclosure, multiple protrusion structures are disposed on the bottom surface of the light condensing light guide plate along the first direction. The protrusion structures may reduce the light emission angle range of the light condensing light guide plate in the first direction. Multiple grooves extending in the first direction are disposed on the protrusion structures. By adjusting the angle between the light receiving surface and the bottom surface of the grooves, the main light-emitting direction of the backlight module along the second direction may be changed. From another point of view, the configuration of the protrusion structures may effectively suppress the stray light generated by the backlight module in the first direction and increase the brightness value of the backlight module. Compared with the conventional backlight module that uses a stack of multiple optical films (e.g., brightness enhancement films and diffusion sheets) and light guide plates, the backlight module of the embodiment only uses a light guide plate (and no microlens structure may be disposed on the light emitting surface of the light guide plate) to achieve the required optical performance, which contributes to reducing the production cost and the overall thickness of the display apparatus.

The foregoing description of the preferred embodiments of the disclosure has been presented for purposes of illustration and description. It is not intended to be exhaustive or to limit the exemplary disclosure to the precise form or to embodiments disclosed. Accordingly, the foregoing description should be regarded as illustrative rather than restrictive. Obviously, many modifications and variations may be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which may allow a searcher to quickly ascertain the subject matter of the technical disclosure of any patent issued from this disclosure. It is submitted with the understanding that it may not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A light condensing light guide plate, comprising:
   a light emitting surface;
   a bottom surface, disposed opposite to the light emitting surface;
   a light incident surface, connected between the light emitting surface and the bottom surface;
   a plurality of protrusion structures, disposed on the bottom surface, wherein the protrusion structures comprise two side surfaces, and the protrusion structures are disposed along a first direction and extend toward a second direction, the first direction is perpendicular to the second direction, the second direction is perpendicular to the light incident surface, each of the protrusion structures comprises a light condensing angle along the first direction, the light condensing angle ranges from 10 degrees to 40 degrees, and the light condensing angle is an angle range corresponding to a half-height width of a light emission distribution of each of the protrusion structures; and
   a plurality of grooves, disposed in the protrusion structures of the light condensing light guide plate, wherein the grooves are disposed along the second direction and extend toward the first direction, the grooves are connected to the corresponding side surfaces, the protrusion structures comprise a light receiving surface that defines each of the grooves and is closer to the light incident surface, and an angle between the light receiving surface and the bottom surface ranges from 35 degrees to 65 degrees.

2. The light condensing light guide plate according to claim 1, wherein a cross section of each of the protrusion structures comprises a side line, the side line comprises a plurality of straight line segments, a slope of the straight line segments increases as the straight line segments approach the bottom surface, and the slope of each of the straight line segments ranges from 0.55 to 5.7.

3. The light condensing light guide plate according to claim 1, wherein the light condensing light guide plate comprises a thickness in a third direction perpendicular to the light emitting surface, the protrusion structures comprise a height in the third direction, and a ratio of the height to the thickness ranges from 0.025 to 0.9.

4. The light condensing light guide plate according to claim 3, wherein when the light condensing angle of the protrusion structure is less than or equal to 40 degrees, the height of the protrusion structure is greater than 0.25 mm.

5. The light condensing light guide plate according to claim 3, wherein each of the protrusion structures comprises a base angle closer to the bottom surface, and the base angle ranges from 30 degrees to 80 degrees.

6. The light condensing light guide plate according to claim 1, wherein a width of each of the protrusion structures along the first direction decreases as the width gets away from the bottom surface, and a minimum width of each of the protrusion structures along the first direction is greater than or equal to 5 µm and less than or equal to 500 µm.

7. The light condensing light guide plate according to claim 1, wherein a profile of a cross section of each of the protrusion structures is polygonal line, curved, or a combination thereof.

8. The light condensing light guide plate according to claim 1, further comprising:
   a plurality of microlens structures, disposed on the light emitting surface, wherein the microlens structures are disposed along the first direction and extend toward the second direction.

9. A display apparatus, comprising:
   a backlight module, comprising:
      a light source, configured to emit an illuminating beam; and
      a light condensing light guide plate, comprising:
         a light emitting surface;
         a bottom surface, disposed opposite to the light emitting surface;
         a light incident surface, connected between the light emitting surface and the bottom surface, wherein the light source is disposed on one side of the light incident surface of the light condensing light guide plate and used to emit the illuminating beam toward the light incident surface, and the illuminating beam is transmitted in the light condensing light guide plate and emitted through the light emitting surface;
         a plurality of protrusion structures, disposed on the bottom surface, wherein the protrusion structures comprise two side surfaces, and the protrusion structures are disposed along a first direction and extend toward a second direction, the first direction is perpendicular to the second direction, the second direction is perpendicular to the light incident surface, the illuminating beam comprises a light condensing angle after being reflected by each of the protrusion structures, the light condensing angle ranges from 10 degrees to 40 degrees, and the light condensing angle is an angle range corresponding to a half-height width of a light emission distribution of each of the protrusion structures; and
         a plurality of grooves, disposed in the protrusion structures of the light condensing light guide plate, wherein the grooves are disposed along the second direction and extend toward the first direction, and the grooves are connected to the corresponding side surfaces, wherein the protrusion structures comprise a light receiving surface that defines each of the grooves and is closer to the light incident surface, and an angle between the light receiving surface and the bottom surface ranges from 35 degrees to 65 degrees; and
   a display panel, overlapped with and disposed on the light emitting surface of the light condensing light guide plate.

10. The display apparatus according to claim 9, wherein a light emission type of the illuminating beam after passing through the display panel is the same as a light emission type of the illuminating beam emitted from the light condensing light guide plate.

11. The display apparatus according to claim 9, wherein the illuminating beam comprises a light emission type on the light emitting surface of the light condensing light guide plate, the light emission type comprises a horizontal light emission angle range along the first direction and a vertical light emission angle range along the second direction, the horizontal light emission angle range is less than 60 degrees, and a ratio of the horizontal light emission angle range to the vertical light emission angle range is greater than 0.9.

* * * * *